United States Patent
Ayandeh

(10) Patent No.: US 10,587,486 B2
(45) Date of Patent: Mar. 10, 2020

(54) DETECTING MICROBURSTS

(71) Applicant: HEWLETT PACKARD ENTERPRISE DEVELOPMENT LP, Houston, TX (US)

(72) Inventor: Siamack Ayandeh, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/965,977

(22) Filed: Apr. 30, 2018

(65) Prior Publication Data
US 2019/0334792 A1    Oct. 31, 2019

(51) Int. Cl.
*H04L 12/26*    (2006.01)
*H04L 12/835*   (2013.01)
*H04L 12/801*   (2013.01)

(52) U.S. Cl.
CPC ............ *H04L 43/062* (2013.01); *H04L 43/04* (2013.01); *H04L 43/16* (2013.01); *H04L 47/11* (2013.01); *H04L 47/30* (2013.01)

(58) Field of Classification Search
CPC ....... H04L 43/062; H04L 43/04; H04L 43/16; H04L 47/11; H04L 47/30
See application file for complete search history.

(56) References Cited

U.S. PATENT DOCUMENTS 7,453,798 B2 * 11/2008 Bradford ................ H04L 47/10
                                                             370/229
7,764,704 B2    7/2010 Tzeng et al.
2010/0182920 A1 * 7/2010 Matsuoka ............... H04L 43/00
                                                             370/252
2014/0064079 A1    3/2014 Kwan et al.
2014/0269378 A1    9/2014 Holbrook et al.
2014/0269379 A1 * 9/2014 Holbrook ............ H04L 43/0882
                                                             370/252
2016/0337142 A1   11/2016 Attar et al.
2016/0373334 A1 * 12/2016 Gintis ..................... H04L 43/50
2017/0012851 A1    1/2017 Teeter et al.
(Continued)

FOREIGN PATENT DOCUMENTS

CN        104852863      8/2015

OTHER PUBLICATIONS

Danfeng Shan et al., "Analyzing and Enhancing Dynamic Threshold Policy of Data Center Switches," Feb. 20, 2017, pp. 2454-2470, IEEE.
(Continued)

*Primary Examiner* — Saad A. Waqas
(74) *Attorney, Agent, or Firm* — Park, Vaughan, Fleming & Dowler LLP

(57) ABSTRACT

Examples provided herein describe a method for facilitating detection of microbursts in queues. For example, a physical processor of a computing device may dynamically determine, for each queue of a plurality of queues of a network switch, whether a monitoring threshold based on an amount of usage of a buffer memory by the plurality of queues. The physical processor may detect, for each queue, whether congestion exists based on whether throughput on the queue exceeds the determined monitoring threshold. The first physical processor may then report information about a set of queues experiencing microbursts in the network switch based on the detection of congestion for each queue.

20 Claims, 3 Drawing Sheets

---

300 RESPONSIVE TO RECEIVING A FIRST PACKET IN A FIRST QUEUE, DETERMINING A FIRST DROP THRESHOLD FOR THE FIRST QUEUE

↓

310 RESPONSIVE TO RECEIVING THE FIRST PACKET, DYNAMICALLY DETERMINING A FIRST MONITORING THRESHOLD

↓

320 RESPONSIVE TO DETERMINING THAT A QUEUE SIZE OF THE FIRST QUEUE AT THE TIME OF THE ARRIVAL OF THE FIRST PACKET IS GREATER THAN THE DYNAMICALLY DETERMINED FIRST MONITORING THRESHOLD, REPORTING A MICROBURST EVENT OF THE FIRST QUEUE

(56) References Cited

U.S. PATENT DOCUMENTS

| | | | |
|---|---|---|---|
| 2017/0048144 A1* | 2/2017 | Liu | H04L 47/122 |
| 2018/0255477 A1* | 9/2018 | Borch | H04W 72/0453 |
| 2019/0042110 A1* | 2/2019 | Bharadwaj | G06F 3/0619 |

OTHER PUBLICATIONS

Extreme Networks, Inc., "Congestion Management and Buffering in Data Center Networks," 2014, pp. 1-10, White Paper.

* cited by examiner

FIG. 4
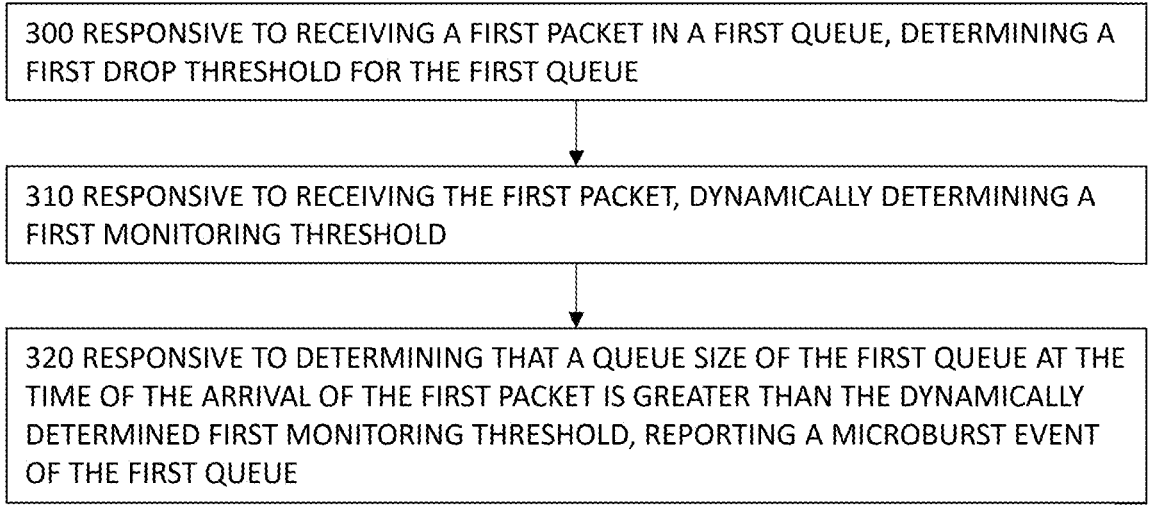
FIG. 4A
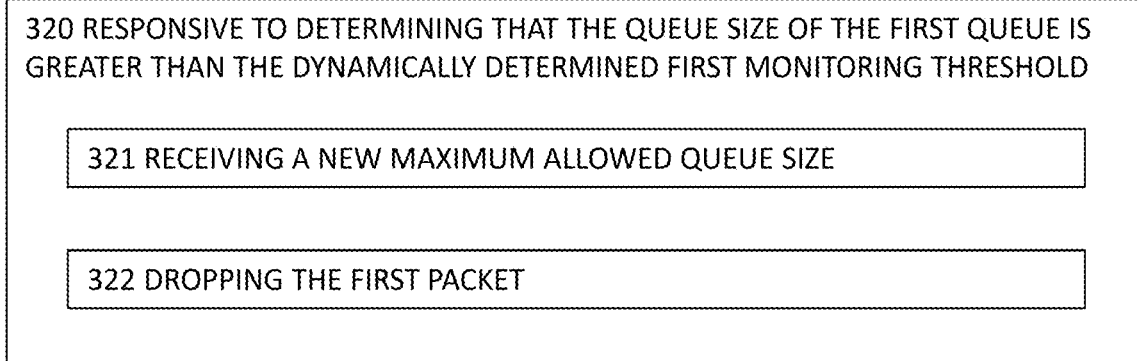
FIG. 4B
330 PROVIDING INFORMATION ABOUT A MICROBURST RESPONSIVE TO DETERMINING THAT THE DYNAMICALLY DETERMINED MONITORING THRESHOLD HAS CHANGED BY A PREDETERMINED AMOUNT DURING A PREDETERMINED TIME PERIOD

006
DETECTING MICROBURSTS

BACKGROUND

A computing device, like a network switch or memory device, may comprise a plurality of input/output ("I/O") ports, with each I/O port associated with a plurality of queues. Many computing devices may comprise thousands of queues across which data may be communicated. As interaction with a computing device may be unpredictable, some or many of these queues across the ports of the computing device may become congested, as more data is being received or sent that can be handled by the queue during a window of time.

BRIEF DESCRIPTION OF THE DRAWINGS

The following detailed description references the drawings, wherein:

FIG. 4 is a flow diagram depicting an example method for detecting microbursts.

FIG. 4A is a flow diagram depicting an example method for detecting microbursts.

FIG. 4B is a flow diagram depicting an example method for detecting microbursts.

DETAILED DESCRIPTION

Figure 1:
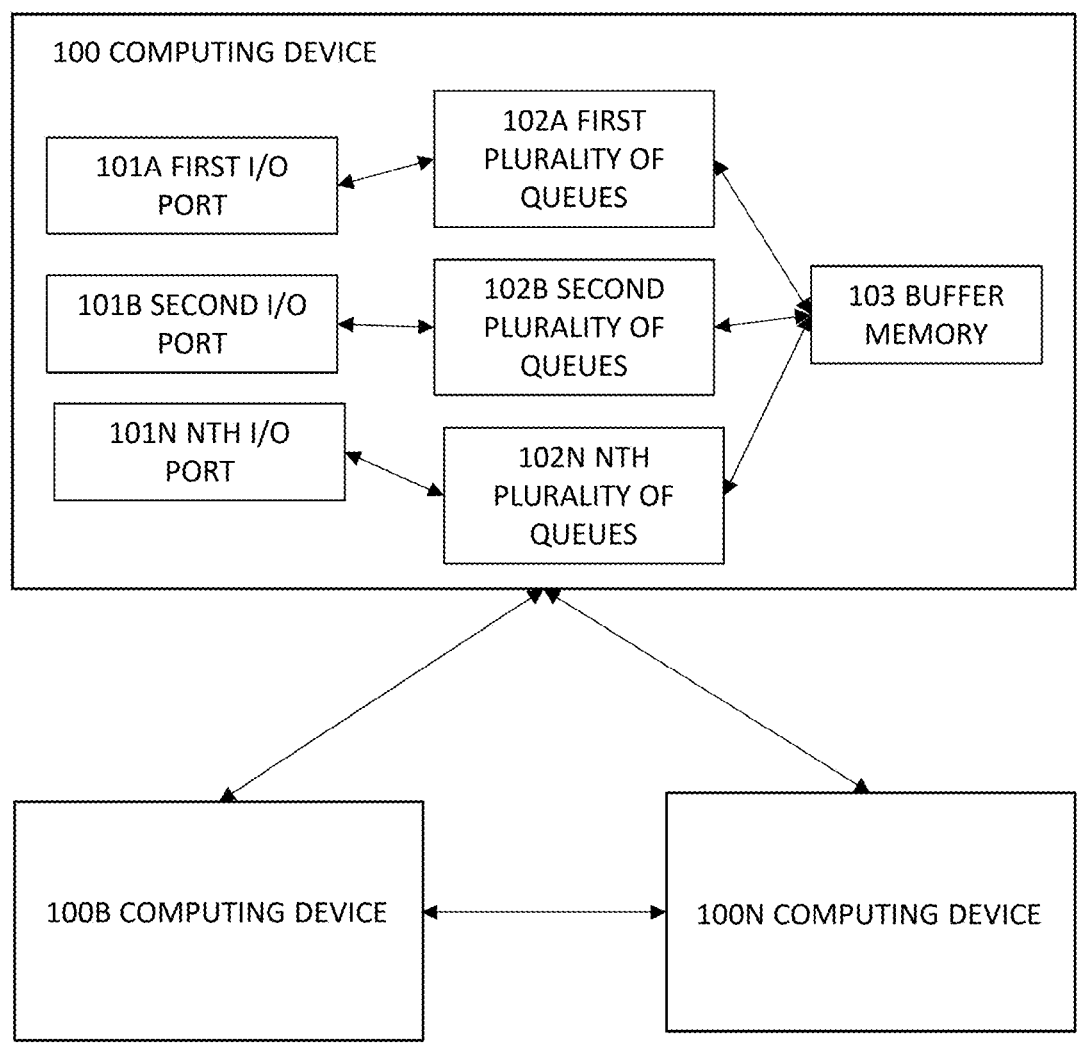
FIG. 1 is a block diagram depicting an example environment in which various examples may be implemented as a system that detects microbursts.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for detecting microbursts. The disclosed examples may include systems, devices, computer-readable storage media, and methods for detecting microbursts. For purposes of explanation, certain examples are described with reference to the components illustrated in FIGS. 1-4B. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-4B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

A computing device, like a network switch or memory device, may comprise a plurality of input/output ("I/O") ports, with each I/O port associated with a plurality of queues. Many computing devices may comprise thousands of queues across which data may be communicated. As interaction with a computing device may be unpredictable, some or many of these queues across the ports of the computing device may become congested, as more data is being received or sent that can be handled by the queue during a window of time.

Queue congestion can occur for multiple reasons and may be more problematic in applications where latency may be an issue. A queue associated with an I/O port could be an input queue, an output queue, an I/O shared memory queue, a cross-bar buffered queue, and/or any other type of queue that maintains and transmits data. Each queue in the system may be communicably coupled to a shared buffer memory. In some examples, each queue may have a fixed max queue size as a threshold to prevent acceptance of packets into a given queue past its storage capabilities. Excess packets may be stored in the shared buffer memory. In some examples, each queue may be allocated a minimum, fixed amount of space (e.g., an equal share) of buffer space in the buffer memory, with the remaining buffer space allocated for use by queues that have exceeded their fixed max queue size. If a small number of queues use that remaining buffer space and are reported to have congestion based on their usage of the buffer space, the other queues that experience congestion may be forced to drop packets faster than the queues that were able to access the additional shared buffer space. The congested traffic of these other ports may be unreported, providing an inaccurate view of overload and data packet traffic patterns. As such, it may be technically challenging to understand how and where congestion is occurring in the network because of the usage of the buffer space and the static thresholds used to report congestion.

A technical solution to these technical challenges would facilitate a dynamic reporting threshold such that information about multiple queues within the system (or computing device, network switch, or other hardware device handling data transmission) that are experiencing congestion at a same time may be reported. The dynamic reporting threshold may change responsive to receiving packets in a queue and responsive to usage of a shared buffer memory used by the queues of the system. To that end, information about congestion may be reported based on the dynamically changing reporting threshold held. As such, a more accurate view of how and where congestion is occurring in the network may be made available.

Examples discussed herein address these technical challenges by facilitating detection of microbursts. For example, the technical solution may dynamically determine, for each queue of a plurality of queues of a network switch, a monitoring threshold based on an amount of usage of a buffer memory by the plurality of queues. The technical solution may then detect, for each queue, whether congestion exists based on whether throughput on the queue exceeds the determined monitoring threshold. Throughput may comprise, for example, a size of the queue, a rate at which data is flowing through the queue, and/or other metrics related to real-time queue size. The technical solution may then report information about a set of queues experiencing a microburst in the network switch based on the detection of congestion for each queue.

FIG. 1 is an example environment in which various examples may be implemented as a system that facilitates detection of microbursts. A microburst may comprise, for example, a spike in traffic for a limited period of time that may be a source of application performance degradation. In some examples, a system that facilitates detection of microbursts may include various components such as a set of computing devices (e.g., devices 100, 100B, . . . , 100N), and/or other devices communicably coupled to the set of computing devices. Each computing device (e.g., computing device 100) may communicate to and/or receive data from the set of other computing devices (e.g., computing devices 101B, . . . , 101N), and/or other components in a network. In some examples, the system may be a data center network and/or other network or system that handles transmission of data.

A computing device may comprise a network switch, a server, a laptop computing device, a desktop computing device, an all-in-one computing device, a web server, a cloud server, a mainframe, a storage card, mobile device, and/or other hardware device that comprises a physical processor that implements machine readable instructions to perform functionality. The physical processor may be at least one central processing unit (CPU), microprocessor, and/or other hardware device suitable for performing the functionality described in relation to FIG. 2.

As shown in FIG. 1, a computing device (e.g., computing device 100) may comprise a plurality of I/O ports (e.g., first I/O port 101A, second I/O port 101B, . . . , nth I/O port 101N). Each I/O port (e.g., 101A, 101B, . . . , 101N) may be associated with a plurality of queues via which communication is maintained (e.g., first plurality of queues 102A associated with first I/O port 101A, second plurality of queues 102A associated with second I/O port 102B, . . . , nth plurality of queues 102N associated with nth I/O port 101N). The plurality of queues (e.g., 102A, 102B, . . . , 102n) may also be communicably coupled to a shared buffer memory 103 that may store information being transmitted, stored, maintained, and/or otherwise handled on some or all of the plurality of queues associated with each I/O port.

According to various implementations, a system that facilitates detection of microbursts and the various components described herein may be implemented in hardware and/or a combination of hardware and programming that configures hardware. Furthermore, in FIG. 1 and other Figures described herein, different numbers of components or entities than depicted may be used.

In some examples, a system that facilitates detection of microbursts may comprise a set of computing devices (e.g., computing devices 100, 1008, . . . , 100N), with a corresponding set of application instances running on the set of computing devices (e.g., computing devices 100, 1008, . . . , 100N). As mentioned above, each queue (e.g., from plurality of queues 102A, 1028, . . . , 102N) in the system may be communicably coupled to the shared buffer memory 103. In some examples, each queue may be associated with various thresholds that help determine activity on the queue (e.g., a dynamic max queue size, a dynamic monitoring threshold, a dynamic drop threshold, and/or other threshold values. A queue may have a dynamic max queue size as a threshold to prevent acceptance of packets into a given queue past its storage capabilities. Congestion may be reported on a queue responsive to throughput on the queue being greater than a dynamic monitoring threshold for the queue. Packets may be dropped in a queue responsive to the throughput exceeding the dynamic drop threshold.

In some examples, for each queue, responsive to receiving a packet, a drop threshold may be determined. The drop threshold may be determined based on a pre-determined percentage of available buffer space in the shared buffer memory 103. The pre-determined percentage may be a number received by a user, received from an administrator of the system, a machine-learned percentage of an average amount of buffer size to make available to each queue, a number retrieved from a storage communicably coupled to the system or from the shared buffer memory, and/or may be otherwise determined. In some examples, the drop threshold may comprise an amount of buffer space in the shared buffer memory 103 that is available after usage of the buffer by the pluralities of queues (e.g., 102A, 1028, . . . , 102N).

Responsive to receiving the packet and determining the drop threshold for the queue, a monitoring threshold may be dynamically determined as a minimum of a current max queue size for the queue and the drop threshold. As such, the monitoring threshold may initially be the max queue size for the queue, but may change to the drop threshold, as the drop threshold value decreases in line with usage of the shared buffer memory 103.

The throughput of the queue at the time of the packet arrival may be compared with the dynamically determined monitoring threshold to determine whether congestion (and a microburst) exists on the queue.

Responsive to determining that the throughput is greater than the dynamically determined monitoring threshold, a microburst event may be reported for the queue. A microburst event may be reported for a queue by providing information related to the queue, including, for example, a queue identifier, metadata related to the queue, queue length, max queue size, a drop threshold for the queue, a monitoring threshold for the queue, an amount of time the queue has been congested, whether and how many packets may have been dropped due to congestion, any combination thereof, and/or other information related to congestion on the queue. A microburst event may be reported for a queue by providing an alert to a user or administrator of the system, by storing information related to the congestion and the microburst in a memory coupled to the system, and/or in other manners.

Responsive to determining the queue is experiencing a microburst event, in some examples, a new max queue size for the queue may be determined. In other examples, packets may be dropped responsive to determining that a microburst event or congestion has occurred. In these examples, the packet may be dropped responsive to determining that the microburst event has occurred, responsive to determining that the queue has been congested for a pre-determined amount of time, and/or based on other factors. In yet other examples, responsive to determining that the dynamically determined monitoring threshold has changed by a predetermined amount in a predetermined time period, a determination may be made that the microburst event has occurred.

Figure 2:
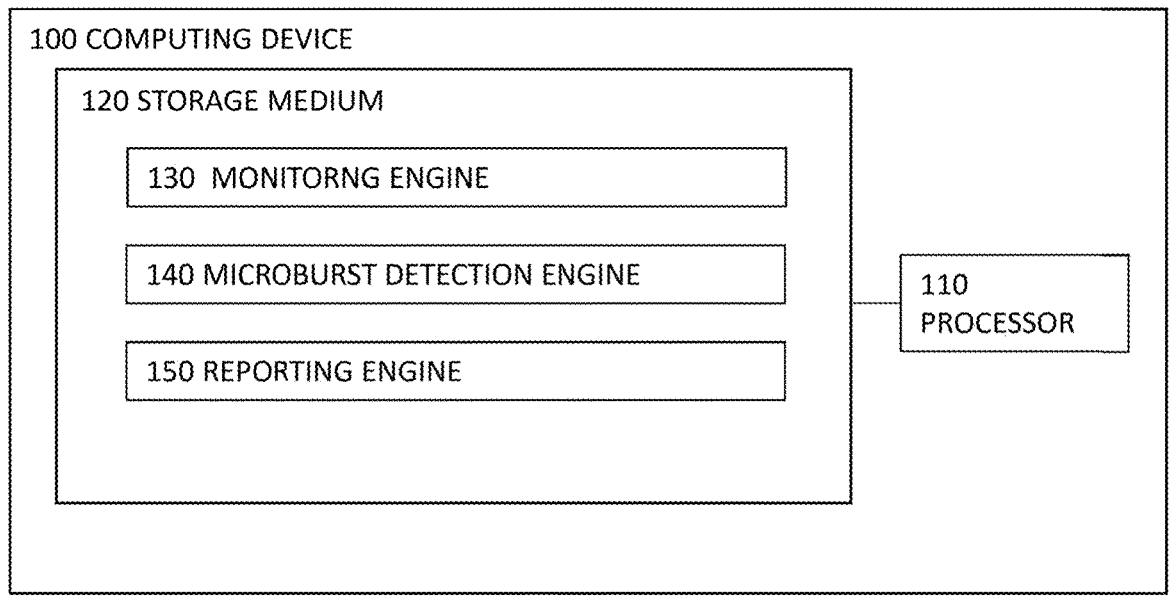
FIG. 2 is a block diagram depicting an example device for detecting microbursts.

FIG. 2 is a block diagram depicting an example device for detection of microbursts. In some examples, the example device 100 may comprise the device 100 of FIG. 1. Computing device 100, which facilitates detection of microbursts, may comprise a physical processor 110, a monitoring engine 130, a microburst detection engine 140, a reporting engine 150, and/or other engines. The term "engine", as used herein, refers to a combination of hardware and programming that performs a designated function. As is illustrated with respect to FIG. 2, the hardware of each engine, for example, may include one or both of a physical processor and a machine-readable storage medium, while the programming is instructions or code stored on the machine-readable storage medium and executable by the physical processor to perform the designated function.

Monitoring engine 130 may dynamically determine, for each queue of the device, a monitoring threshold. The monitoring engine 130 may determine the monitoring threshold based on a minimum of a maximum queue size for the queue and an amount of usage of the buffer memory by the plurality of queues, based on an amount of usage of the buffer memory by the plurality of queues, and/or based on other factors. For example, the monitoring engine 130 may, responsive to receiving a first packet in a first queue associated with a first input/output ("I/O") port, determine a first drop threshold for the first queue based on a first available amount of memory in a buffer memory communicably coupled to the first queue. In another example, the monitoring engine 130 may, responsive to receiving the first packet, dynamically determine a first monitoring threshold based on a minimum of a maximum queue size for the first queue and the determined first drop threshold. In some examples, the monitoring engine 130 may dynamically determine the monitoring threshold for each queue in a manner similar or the same as described above with respect to FIG. 1.

The microburst detection engine 140 may detect, for each queue, whether a microburst event exists based on whether throughput on the queue or a size of the queue exceeds the determined monitoring threshold. In some examples, the microburst detection engine 140 may dynamically determine the monitoring threshold for each queue in a manner similar or the same as described above with respect to FIG. 1.

The reporting engine 150 may report information about a set of queues experiencing a microburst event based on the detection of a microburst event for each queue. For example, the reporting engine 150 may report a microburst event for a queue responsive to determining that a queue size of the first queue at the time of the arrival of the first packet is greater than the dynamically determined first monitoring threshold. In some examples, the reporting engine 150 may report information about the set of queues in a manner similar or the same as described above with respect to FIG. 1.

In performing their respective functions, engines 130-150 may access storage medium 120 and/or other suitable database(s). Storage medium 120 may represent any memory accessible to the device 100 that can be used to store and retrieve data. Storage medium 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The device 100 that facilitates detection of microbursts may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 3:
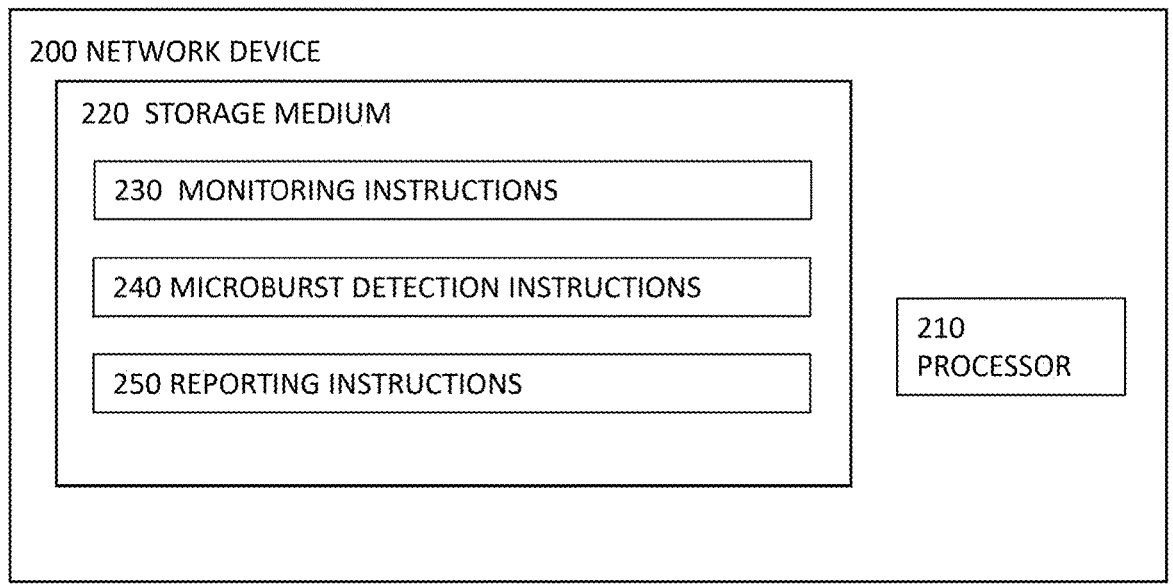
FIG. 3 is a block diagram depicting an example device for detecting microbursts.

FIG. 3 is a block diagram depicting an example machine-readable storage medium 220 comprising instructions executable by a processor for detection of microbursts.

In the foregoing discussion, engines 130-150 were described as combinations of hardware and programming. Engines 130-150 may be implemented in a number of fashions. Referring to FIG. 3, the programming may be processor executable instructions 230-250 stored on a machine-readable storage medium 220 and the hardware may include a physical processor 210 for executing those instructions. Thus, machine-readable storage medium 220 can be said to store program instructions or code that when executed by physical processor 210 implements a device that facilitates detection of microbursts of FIG. 1.

In FIG. 3, the executable program instructions in machine-readable storage medium 220 are depicted as monitoring instructions 230, microburst detection instructions 240, reporting instructions 250, and/or other instructions. Instructions 230-250 represent program instructions that, when executed, cause processor 210 to implement engines 130-150, respectively.

Machine-readable storage medium 220 may be any electronic, magnetic, optical, or other physical storage device that contains or stores executable instructions. In some implementations, machine-readable storage medium 220 may be a non-transitory storage medium, where the term "non-transitory" does not encompass transitory propagating signals. Machine-readable storage medium 220 may be implemented in a single device or distributed across devices. Likewise, processor 210 may represent any number of physical processors capable of executing instructions stored by machine-readable storage medium 220. Processor 210 may be integrated in a single device or distributed across devices. Further, machine-readable storage medium 220 may be fully or partially integrated in the same device as processor 210, or it may be separate but accessible to that device and processor 210.

In one example, the program instructions may be part of an installation package that when installed can be executed by processor 210 to implement a device that facilitates detection of microbursts. In this case, machine-readable storage medium 220 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 220 may include a hard disk, optical disk, tapes, solid state drives, RAM, ROM, EEPROM, or the like.

Processor 210 may be at least one central processing unit (CPU), microprocessor, and/or other hardware device suitable for retrieval and execution of instructions stored in machine-readable storage medium 220. Processor 210 may fetch, decode, and execute program instructions 230-260, and/or other instructions. As an alternative or in addition to retrieving and executing instructions, processor 210 may include at least one electronic circuit comprising a number of electronic components for performing the functionality of at least one of instructions 230-260, and/or other instructions.

FIG. 4 is a flow diagram depicting an example method for detection of microbursts. The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 4 as illustrated (and described in greater detail below) is meant be an example and, as such, should not be viewed as limiting. The method of FIG. 4 may be implemented in the form of executable instructions stored on a machine-readable storage medium, such as storage medium 220, and/or in the form of electronic circuitry.

In an operation 300, responsive to receiving a first packet in a first queue associated with a first input/output ("I/O") port, a first drop threshold for the first queue may be determined based on a first available amount of memory in a buffer memory communicably coupled to the first queue. For example, the device 100 (and/or the monitoring engine 130, the monitoring instructions 230, or other resource of the device 100) may determine the first drop threshold. The device 100 may determine the first drop threshold in a manner similar or the same as that described above in relation to the execution of the monitoring engine 130, the monitoring instructions 230, and/or other resource of the device 100.

In an operation 310, responsive to receiving the first packet, a first monitoring threshold may be dynamically determined based on a minimum of a maximum queue size for the first queue and the determined first drop threshold. For example, the device 100 (and/or the monitoring engine 130, the monitoring instructions 230, or other resource of the device 100) may dynamically determine the first monitoring threshold. The device 100 may dynamically determine the first monitoring threshold in a manner similar or the same as that described above in relation to the execution of the monitoring engine 130, the monitoring instructions 230, and/or other resource of the device 100.

In an operation 320, responsive to determining that a queue size of the first queue at the time of the arrival of the first packet is greater than the dynamically determined first monitoring threshold, a microburst event of the first queue may be reported. For example, the device 100 (and/or the reporting engine 150, the reporting instructions 250 or other resource of the device 100) may report a microburst event of the first queue. The device 100 may report a microburst event of the first queue in a manner similar or the same as that described above in relation to the execution of the reporting engine 150, the reporting instructions 250, and/or other resource of the device 100.

In some example, several actions may occur after or in conjunction with reporting a microburst event of the first queue. FIG. 4A is a flow diagram depicting example action items after reporting a microburst event on a queue (from operation 320). These example actions may be performed separately, in conjunction, and/or in parallel to each other. Further, some or all or none of these actions may be performed responsive to reporting a microburst event.

In an operation 321, a new maximum allowed queue size may be received responsive to reporting a microburst event of the first queue. For example, the device 100 (and/or the monitoring engine 130, the monitoring instructions 230, and/or other resource of the device 100) may receive a new maximum allowed queue size. The device 100 may receive a new maximum allowed queue size in a manner similar or the same as that described above in relation to the execution of the monitoring engine 130, the monitoring instructions 230, and/or other resource of the device 100.

In an operation 322, responsive to the queue size being greater than the first monitoring threshold, the first packet may be dropped. For example, the device 100 (and/or the reporting engine 150, the reporting instructions 250 or other resource of the device 100) may drop the first packet. The device 100 may drop the first packet in a manner similar or the same as that described above in relation to the execution of the reporting engine 150, the reporting instructions 250, and/or other resource of the device 100.

FIG. 4B is a flow diagram depicting an example method for detection of microbursts. In an operation 330, information about a microburst may be provided responsive to determining that the dynamically determined monitoring threshold changed by a predetermined amount during a predetermined time period. For example, the device 100 (and/or the reporting engine 150, the reporting instructions 250 or other resource of the device 100) may provide information about the microburst. The device 100 may provide information about the microburst in a manner similar or the same as that described above in relation to the execution of the reporting engine 150, the reporting instructions 250, and/or other resource of the device 100.

The foregoing disclosure describes a number of example implementations for detection of microbursts. The disclosed examples may include systems, devices, computer-readable storage media, and methods for detection of microbursts. For purposes of explanation, certain examples are described with reference to the components illustrated in FIGS. 1-4B. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A network switch that detects microbursts comprising:
a plurality of input/output ("I/O") ports;
for each I/O port, a plurality of queues;
a buffer memory;
a physical processor implementing machine readable instructions to:
dynamically determine, for each queue of the network switch, a drop threshold based on a user-determined amount of memory available in the buffer memory after usage of the buffer memory by the plurality of queues for the plurality of ports;
dynamically determine, for each queue, a monitoring threshold based on a minimum of a maximum queue size for the queue and the determined drop threshold;
detect, for each queue, whether a microburst exists based on whether throughput on the queue exceeds the determined monitoring threshold; and
report information about a set of queues experiencing microburst events in the network switch based on the detection of microbursts for each queue.

2. The network switch of claim 1, wherein the physical processor implements machine readable instructions that cause the network switch to:
provide information about a microburst in the network switch responsive to determining that the dynamically determined monitoring threshold changed by a predetermined amount during a predetermined time period.

3. The network switch of claim 1, wherein the physical processor implements machine readable instructions that cause the network switch to:
determine the drop threshold alternatively based on a machine-learned average amount of buffer size available to each queue; and
determine the monitoring threshold further based on a minimum of a maximum queue size and the determined drop threshold.

4. The network switch of claim 1, wherein the physical processor implements machine readable instructions that cause the network switch to:
determine the monitoring threshold for a first queue responsive to receiving a first packet in the queue.

5. The network switch of claim 4, wherein the physical processor implements machine readable instructions that cause the network switch to:
responsive to receiving a second packet in a second queue of the network, dynamically determining a second monitoring threshold based on a second amount of usage of the buffer memory at the time the second packet was received;
detect for the second queue, whether a second microburst exists based on whether throughput on the second queue exceeds the second monitoring threshold; and
report information about the second queue experiencing the second microburst in the network switch based on detecting the second microburst for the second queue.

6. The network switch of claim 5, wherein the physical processor implements machine readable instructions that cause the network switch to:
responsive to determining that the second microburst exists for the second queue, reporting the second microburst.

7. The network switch of claim 1, wherein the physical processor implements machine readable instructions that cause the network switch to report congestion by:
reporting, from each queue in which a microburst is detected, a queue identifier, metadata related to the queue, and a queue length.

8. A computing device for detecting microbursts comprising:
a plurality of input/output ("I/O") ports;
for each I/O port, a plurality of queues;
a buffer memory;
a physical processor implementing machine readable instructions to:
dynamically determine, for each queue of the device, a drop threshold based on a user-determined amount of memory available in the buffer memory after usage of the buffer memory by the plurality of queues for the plurality of ports;
dynamically determine, for each queue, a monitoring threshold based on a minimum of a maximum queue size for the queue and the determined drop threshold;
detect, for each queue, whether a microburst exists based on whether throughput on the queue exceeds the determined monitoring threshold; and
report information about a set of queues experiencing a microburst event in the device based on the detection of microbursts for each queue.

9. The computing device of claim 8, wherein the physical processor implements machine readable instructions that cause the computing device to:
provide information about a microburst in the computing device responsive to determining that the dynamically determined monitoring threshold changed by a predetermined amount during a predetermined time period.

10. The computing device of claim 8, wherein the physical processor implements machine readable instructions that cause the computing device to:
determine the drop threshold alternatively based on a machine-learned average amount of buffer size available to each queue.

11. The computing device of claim 8, wherein the physical processor implements machine readable instructions that cause the computing device to:
determine the monitoring threshold for a first queue responsive to receiving a first packet in the queue; and
responsive to determining that the microburst exists for the first queue, report the microburst event.

12. The computing device of claim 11, wherein the physical processor implements machine readable instructions that cause the computing device to:
responsive to receiving a second packet in a second queue of the network, dynamically determining a second monitoring threshold based on a second amount of usage of the buffer memory at the time the second packet was received;
detect for the second queue, whether a second microburst exists based on whether throughput on the second queue exceeds the second monitoring threshold; and
report information about the second queue experiencing the second microburst in the network switch based on detecting the second microburst for the second queue.

13. The computing device of claim 8, wherein the physical processor implements machine readable instructions that cause the computing device to report microbursts by:
reporting, from each queue in which microburst is detected, a queue identifier, metadata related to the queue, and a queue length.

14. A method for detecting microbursts, comprising:

responsive to receiving a first packet in a first queue associated with a first input/output ("I/O") port, determining a first drop threshold for the first queue based on a user-determined amount of memory available in a buffer memory after usage of the buffer memory by a plurality of queues, wherein the buffer memory is communicably coupled to the first queue;

responsive to receiving the first packet, dynamically determining a first monitoring threshold based on a minimum of a maximum queue size for the first queue and the determined first drop threshold; and responsive to determining that a queue size of the first queue at the time of the arrival of the first packet is greater than the dynamically determined first monitoring threshold, reporting a microburst event of the first queue.

15. The method of claim 14, further comprising:

responsive to reporting the microburst event of the first queue, receiving a new maximum allowed queue size.

16. The method of claim 14, responsive to the queue size being greater than the first monitoring threshold, reporting the microburst event.

17. The method of claim 14, further comprising:

responsive to receiving a second packet in the first queue, determining a second threshold for the first queue based on a second available amount of memory in the buffer memory;

responsive to receiving the second packet, determining a second dynamic monitoring threshold based on the maximum queue size for the first queue and the determined second reporting threshold;

responsive to determining that the queue size at the time of arrival of the second packet is greater than the second monitoring threshold, reporting a second microburst event on the first queue.

18. The method of claim 14, further comprising:

determining the dynamic monitoring threshold at predetermined time intervals.

19. The method of claim 14, further comprising:

providing information about the microburst event responsive to determining that the dynamically determined monitoring threshold changed by a predetermined amount during a predetermined time period.

20. The method of claim 14, further comprising:

reporting, from each queue in which the microburst is detected, information about the queue, wherein the information includes a queue identifier, metadata about the queue, and queue length.

* * * * *